Figure 1:
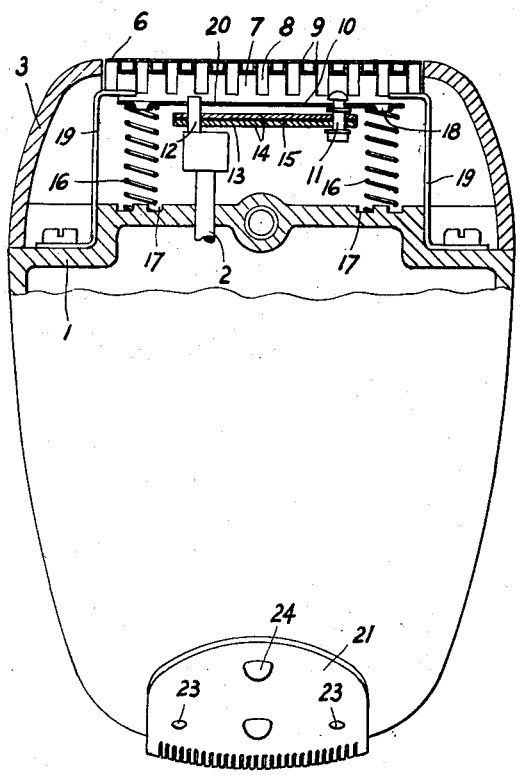

Aug. 13, 1957 G. HEYEK 2,802,261
DRY-SHAVING APPARATUS WITH A FLEXIBLE SHEAR PLATE
Filed Feb. 15, 1955

INVENTOR
Gerhard Heyek
BY Watson, Cole, Grindle & Watson
ATTORNEYS

United States Patent Office 2,802,261
Patented Aug. 13, 1957

2,802,261

DRY-SHAVING APPARATUS WITH A FLEXIBLE SHEAR PLATE

Gerhard Heyek, Graz, Styria, Austria

Application February 15, 1955, Serial No. 488,280

Claims priority, application Austria February 26, 1954

2 Claims. (Cl. 30—43)

This invention relates to dry shaving apparatus having a closed cutter head which comprises a curved stationary shear plate and a reciprocable lower blade having an approximately semicylindrical cutting surface, which is urged against the shear plate.

A cutter head of this type is known (cf. Austrian Patent No. 171,778), in which the shear plate formed of flexible sheet metal laterally adjoints the cutter head carrier as far as to the beginning of its curvature, which substantially agrees to the cutting surface of the lower blade, whereas the curved part of the shear plate protruding beyond the cutter head carrier fully adapts to the form of the cutting blade owing to its resiliency, under the action of the elastically urged rigid lower blade. This arrangement ensures a good cooperation of the blade members without requiring an accurate relative grinding thereof, as is necessary with a rigid upper blade (shear plate) and lower blade.

In that known cutter head and in similar constructions the resilient force which urges the movable lower blade against the stationary shear plate is supplied as a rule by sliding or rolling pressure members or by a spring which is supported on the driving member for the movable blade member, e. g. a sliding crank mechanism, an eccentric mechanism, an oscillating lever, or the like. In that constructions the driving force for the movable blade member must overcome not only the friction between the two blade members, but also the friction caused by the reactive force of the spring or the like. For this reason the drive motor must have a much higher rating than would be necessary for the cutting or shearing operation as such.

On the other hand, open cutter heads are known (cf. German Patent No. 457,947 and U. S. Patent No. 2,333,446) in which the friction is reduced because the movable blade member is urged by one or several springs against the stationary blade member; one end of said springs is held at point which is fixed relative to the apparatus whereas the other end is undisplaceably supported on the movable blade member. With that construction the drive motor must supply only the work required to overcome the friction between the two relatively movable blade members and the relatively small work which is involved in the deformation of the pressure springs and is partly recovered by their resilient re-deformation.

In all these known cutter heads comprising a reciprocating blade member the latter is not displaceable transversely to its direction of movement but is guided in special guide members or, where the upper blade is rigid, in the upper blade itself, or is at least prevented by the drive mechanism from being laterally displaced. For this reason the drive mechanism must be adjusted with relatively high accuracy, even where a deformable shear plate is used which adapts to the lower blade, because the direction of movement of the lower blade must be caused to coincide with the axis of the curvature of the shear plate to ensure a perfect cooperation between the shear plate and lower blade during operation. For the same reason any replacement parts which affect the relative position of lower blade and shear plate must be manufactured with relatively small limits and fitted with high precision.

It is a general object of the invention to provide a cutter head which eliminates the aforesaid difficulties, which appreciably add to the costs of manufacture of the known cutter heads.

It is a more specific object of the invention to provide dry shaving apparatus in which the shear plate forms for the lower blade a resilient guide which is independent of the accuracy with which the drive mechanism is fitted.

Another more specific object of the invention resides in the provision of means for supporting the lower blade against the spring force exercised thereon when the shear plate has been removed from the apparatus.

With these and other objects in mind, which will become apparent as the specification proceeds, the invention provides dry shaving apparatus comprising, in combination, a casing, a shear plate carrier affixed to said casing, a flexible shear plate having a concave lower surface and two longitudinal edges and affixed to said carrier only at said longitudinal edges to be deformable in respect of the curvature of said lower surface, a lower blade having a substantially cylindrical cutting surface, a drive mechanism contained in said casing and operatively connected to said lower blade for reciprocating the same in the axial direction of its cutting surface, and at least one compression-elastic and omnidirectionally flexure-elastic member extending transversely to said cutting surface and having one end undisplaceably held relative to the casing and another end undisplaceably held relative to the lower blade, whereby said lower blade is urged against said lower surface of said shear plate and held with freedom of lateral translation and oscillation in respect of the axial direction of its cutting surface, and said shear plate is caused to adapt to the form of the lower blade and at the same time forms a yielding guide for the lower blade.

The invention further provides in dry shaving apparatus comprising a casing, a shear plate carrier removably affixed to said casing, and a shear plate affixed to said carrier, the combination of a reciprocable lower blade, resilient means urging said lower blade against said shear plate, and stops attached to said casing and normally disengaged from said lower blade, said stops being arranged to support said lower blade against the force exercised thereon by said resilient means when said shear plate carrier and shear plate have been removed from the casing.

In that construction the lower blade may be considered to be floatingly guided in the flexible, curved shear plate because owing to their omnidirectional flexibility the resilient members urging the lower blade against the shear plate permit of a transverse displacement of the lower blade. Owing to this transverse displaceability of the lower blade the drive mechanism need no longer be carefully adjusted relative to the shear plate but the lower blade will adjust itself to the correct position relative to the axis of curvature of the shear plate and the shear plate adapts to the form of the lower blade and forms a yielding guide therefore. This also facilitates the fitting of replacement parts considerably.

Figure 2:
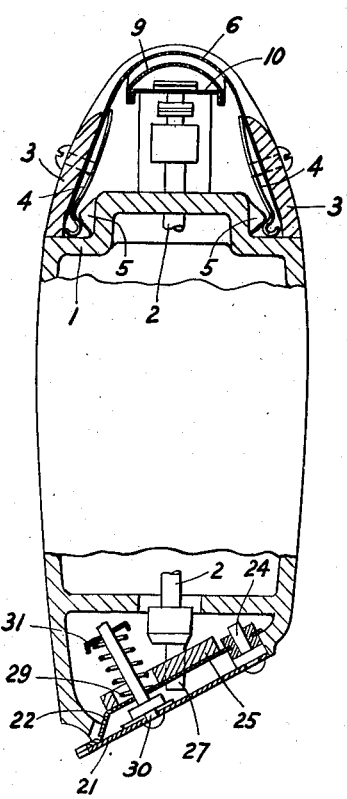
Figure 3:
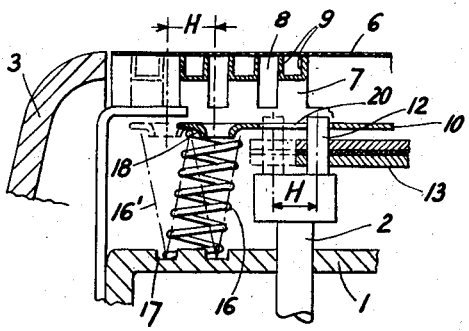

An illustrative embodiment of the invention will now be explained in more detail with reference to the drawing, in which Figs. 1 and 2 are partly sectional front and side views showing the dry-shaving apparatus, Fig. 3 is a fragmentary sectional view on an enlarged scale for illustrating the invention.

Figure 4:
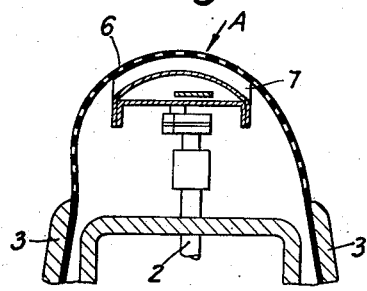

Fig. 4 is a cross section through the co-acting shear members showing these members in their relative positions during use of the apparatus.

The dry-shaving apparatus shown in Figs. 1 to 3 comprises a casing 1, preferably of plastic, which accommodates an electric drive motor, of which only the drive shaft 2 is shown, which passes through the upper and lower walls of the casing. A cap 3, e. g. of plastic, is mounted on the upper part of the casing and may be fixed to the casing with the aid of clamping springs 4 having hooked ends, which engage behind two noses 5 formed laterally on a projecting central part of the upper wall of the casing. The top portion of the cap 3 is apertured to the extent of a semicylinder and is closed by a shear plate 6 formed with sievelike perforations. The longitudinal edges of the shear plate 6 are fixed to the side walls of the cap, e. g. with rivets. No additional support is provided in the transverse direction so that the perforated plate is free to deflect. The lower blade 7 is accommodated in the concave space defined by the shear plate 6. According to my prior application Ser. No. 472,088, filed November 30, 1954, that lower blade comprises a cylindrically curved sheet metal body having a plurality of peripherally extending cuts 8, and the edges of the lands between the cuts are bent radially outwardly in the form of flanges 9 and ground in accordance with a common cylindrical surface to form sharp cutting edges. The cylindrically curved blade body is connected along a chord plane to a flat plate 10, e. g. by welding or riveting, which is formed with a round hole for receiving a coupling pin 11.

The upper end of the drive shaft 2 is provided with an eccentric pin 12 which engages in a transverse hole of a connecting rod 13. The connecting rod consists of two laminations 14 of plastic-impregnated fabric, between which a lubricant-absorbing interlayer 15, e. g. of the filter paper, is disposed. At the other end the connecting rod 13 has affixed thereto the afore-mentioned coupling pin 11.

The lower blade is held so that it is free to adjust laterally and is urged by two coil springs 16 against the curved shear plate 6. The lower ends of the coil springs are undisplaceably held in annular grooves 17 at the upper wall of casing 1 whereas the upper ends of the coil springs surround annular beads formed around apertures 18 in the base plate 10 of the lower blade, whereby they are undisplaceably held at that base plate.

The springs 16 urge the lower blade against the shear plate in such a manner that no axial force, which would have to be absorbed by a thrust bearing, is exercised on the connecting rod 13 and/or the drive shaft 2. According to Fig. 3 the reciprocating movement through the distance H which is transmitted to the lower blade 7 by means of the eccentric pin 12, the connecting rod 13 and the coupling pin 11 during a rotation of the drive shaft 2 causes the coil springs to oscillate between the position 16 shown with solid lines and the position 16' indicated with dotted lines. No sliding friction occurs at the held lower ends of these springs so that only that amount of work must be expended which is required to deform the springs 16; the major part of that work is recovered by resilient re-deformation in the course of the periodic movement. The springs 16 permit of a free lateral adjustment of the lower blade in the curved shear plate.

To hold the lower blade when the cap 3 has been removed for cleaning the apparatus, hooked parts 19 are affixed to the casing 1 on both sides of the lower blade. The free ends of said parts 19 extend into the space between the blade body proper of the lower blade 7 and its base plate 10 without normally contacting said parts. As soon as the cap 3 with the shear plate 6 is removed, the lower blade 7 is urged outwardly by the coil springs 16 until the base plate 10 of the lower blade engages the hooked stops 19.

The eccentric pin 12 engages in an appropriately sized circular aperture 20 in the base plate 10 of the lower blade and is of such a length as to remain in said aperture even after the lower blade has been displaced by the springs 16. Thus the pin 12 limits the possible lateral displacement of the lower blade.

The lower part of the dry shaving apparatus shown comprises an open cutter head of known type, which comprises two relatively oscillating comb blades 21 and 22. The outer comb blade 21 is affixed to an inclined wall portion of the casing 1 by means of screws or rivets 23 and carries a pivot pin 24 on which the movable inner comb blade 22 is oscillatable. A reinforcing plate 25 mounted on the central portion of the movable comb blade 22 is formed with a guide slot which extends also through the adjoining part of the comb blade 22. That slot receives an eccentric pin 27, which is fixed to the lower end of the drive shaft 2 of the motor. When the eccentric pin 27 moves along a circle during the rotation of the motor shaft 2, the movable comb blade 22 will perform an oscillating movement on the pivot pin 24. The movable comb blade 22 and the reinforcing plate 25 are provided with a bore 29, which receives a stud 30 affixed to the stationary comb blade 21. That stud 30 carries a spring plate 31 at its upper end. The bore in the comb blade 22 is somewhat smaller in diameter than the bore in the reinforcing plate 25 to leave an annular margin, which serves as a supporting surface for a coil spring 28, which is inserted between the movable comb blade 22 and the spring plate 31 and surrounds the stud 30 with a clearance. Thus the coil spring urges the movable comb blade resiliently against the stationary one. As shown in Fig. 4, during use of the dry-shaving apparatus the flexible shear plate 6 will be deformed and the lower blade 7 will be shifted laterally dependent upon the direction A of the pressure exerted on these parts. In the working range of these shearing members, that is, in the vicinity of the arrow A, the flexible plate 6 accommodates itself exactly to the shape of the lower blade 7, thus ensuring optimal operation without the requirement of precise manufacture or assembly of the operating parts.

The illustrative embodiment shown permits of various modifications within the scope of the invention. For instance, the coil springs 16 may be replaced by rubber rods or tubes. In all cases a very simple construction is achieved, which does not require accurate fitting work, and the temperature rise of the apparatus is reduced owing to the reduced motor power.

What I claim is:

1. Dry shaving apparatus comprising, in combination, a casing, a shear plate carrier affixed to said casing, a flexible shear plate having a concave lower surface and two longitudinal edges and affixed to said carrier only at said longitudinal edges to be deformable in respect of the curvature of said lower surface, a lower blade having a cylindrical cutting surface and mounted with freedom of lateral translation and reciprocation in respect of the axial direction of its coating surface, a drive mechanism contained in said casing and operatively connected to said lower blade for reciprocating the same in the axial direction of its cutting surface, and at least one compression-elastic and omnidirectionally flexure-elastic member extending transversely to said cutting surface and having one end undisplaceably held relative to the casing and another end undisplaceably held relative to the lower blade, whereby said lower blade is urged against said lower surface of said shear plate and held with freedom of lateral translation, and said shear plate is caused to adapt to the form of the lower blade and at the same time forms, a yielding guide for the lower blade.

2. In dry shaving apparatus comprising a casing, a shear plate carrier removably affixed to said casing, and a shear plate affixed to said carrier, the combination of a reciprocable lower blade, resilient means urging said lower blade against said shear plate, and stops attached to said casing and normally disengaged by said lower blade, said stops positioned on the opposite side of said lower blade from said resilient means and spaced from the lower blade to support said lower blade against the force exercised thereon by said resilient means when said shear plate carrier and shear plate have been removed from the casing.

References Cited in the file of this patent

UNITED STATES PATENTS

| | | |
|---|---|---|
| 2,098,849 | Amsler | Nov. 9, 1937 |
| 2,141,582 | Wimberger | Dec. 27, 1938 |